(12) United States Patent
Djelassi-Tscheck et al.

(10) Patent No.: US 12,341,332 B2
(45) Date of Patent: Jun. 24, 2025

(54) INTELLIGENT SEMICONDUCTOR SWITCH

(71) Applicant: Infineon Technologies AG, Neubiberg (DE)

(72) Inventors: Christian Djelassi-Tscheck, Villach (AT); Alexander Mayer, Treffen (AT)

(73) Assignee: Infineon Technologies AG, Neubiberg (DE)

(*) Notice: Subject to any disclaimer, the term of this patent is extended or adjusted under 35 U.S.C. 154(b) by 208 days.

(21) Appl. No.: 18/331,992

(22) Filed: Jun. 9, 2023

(65) Prior Publication Data
US 2023/0411947 A1    Dec. 21, 2023

(30) Foreign Application Priority Data
Jun. 15, 2022    (DE) .......................... 102022115099.2

(51) Int. Cl.
*H02H 3/00*    (2006.01)
*H02H 1/00*    (2006.01)
*H02H 5/04*    (2006.01)

(52) U.S. Cl.
CPC .............. *H02H 3/00* (2013.01); *H02H 1/0007* (2013.01); *H02H 5/047* (2013.01)

(58) Field of Classification Search
CPC .............. H01H 2071/006; H01H 71/04; H01H 83/08; H02H 1/0007; H02H 11/003;
(Continued)

(56) References Cited

U.S. PATENT DOCUMENTS

| | | |
|---|---|---|
| 4,245,318 A | 1/1981 | Eckart et al. |
| 4,939,347 A | 7/1990 | Masaka et al. |

(Continued)

FOREIGN PATENT DOCUMENTS

| | | |
|---|---|---|
| DE | 102004063946 A1 | 3/2006 |
| DE | 102016100498 A1 | 7/2016 |

(Continued)

OTHER PUBLICATIONS

Infineon Technologies AG, "BTN8962TA High Current PN Half Bridge NovalithIC™," Data Sheet, Rev. 1.0, May 17, 2013, 26 pp.
(Continued)

*Primary Examiner* — Jared Fureman
*Assistant Examiner* — Nicolas Bellido
(74) *Attorney, Agent, or Firm* — Shumaker & Sieffert, P.A.

(57) ABSTRACT

A circuit may comprise an electronic switch with a load current path, which is switched between an output node and a supply node and is designed to connect or disconnect the output node to or from the supply node in accordance with a control signal. The circuit further comprises a control circuit which is designed to generate the control signal based on an input signal, and a current monitoring circuit which is designed to receive a current measurement signal that represents the load current flowing through the load current path, and to generate a protective signal, based on the current measurement signal, which indicates whether the output node should be disconnected from the supply node. The circuit further comprises a reverse current detection circuit, which is designed to detect that the load current is flowing in the reverse direction, namely from the output node to the supply node.

10 Claims, 3 Drawing Sheets

(58) Field of Classification Search
CPC ............ H02H 3/00; H02H 3/08; H02H 3/087; H02H 3/18; H02H 5/047; H02J 7/0031; H02J 7/0034; H02J 7/0036; H02J 9/061; H03K 17/08142; H03K 17/0822; H03K 17/0828; H03K 17/122; H03K 17/18; H03K 17/302; H03K 17/687; H03K 17/6877; H03K 17/693; H03K 2017/066; H03K 2017/0806; H03K 2017/307; H03K 2017/6875; H03K 2217/0027; H03K 2217/0054
See application file for complete search history.

(56) References Cited

U.S. PATENT DOCUMENTS

| | | | |
|---|---|---|---|
| 5,517,379 | A | 5/1996 | Williams et al. |
| 5,719,509 | A | 2/1998 | Chan |
| 5,862,390 | A | 1/1999 | Ranjan |
| 5,877,647 | A | 3/1999 | Vajapey et al. |
| 6,054,845 | A | 4/2000 | Feldtkeller |
| 6,144,085 | A | 11/2000 | Barker |
| 6,166,502 | A | 12/2000 | Pattok et al. |
| 6,400,163 | B1 | 6/2002 | Melcher et al. |
| 6,924,669 | B2 | 8/2005 | Itoh et al. |
| 7,279,765 | B2 | 10/2007 | Ahn et al. |
| 7,489,855 | B2 | 2/2009 | Kraus |
| 8,018,245 | B2 | 9/2011 | Sohn |
| 9,293,907 | B2 | 3/2016 | Ueta et al. |
| 9,413,352 | B2 | 8/2016 | Lim |
| 9,672,201 | B1 | 6/2017 | Uszkoreit et al. |
| 9,705,394 | B2 | 7/2017 | Ohshima |
| 9,887,532 | B2 | 2/2018 | Djelassi et al. |
| 9,954,548 | B2 | 4/2018 | Illing et al. |
| 10,170,905 | B2 | 1/2019 | Illing et al. |
| 10,305,363 | B1 | 5/2019 | Chen et al. |
| 10,868,418 | B2 | 12/2020 | Djelassi-Tscheck et al. |
| 11,018,664 | B2 | 5/2021 | Bernardoni et al. |
| 11,177,644 | B2 | 11/2021 | Mayer et al. |
| 11,271,558 | B2 | 3/2022 | Djelassi-tscheck et al. |
| 11,349,471 | B2 | 5/2022 | Mayer et al. |
| 11,404,866 | B2 | 8/2022 | Illing et al. |
| 11,405,032 | B2 | 8/2022 | Bernardoni et al. |
| 11,431,162 | B2 | 8/2022 | Djelassi-tscheck et al. |
| 11,527,881 | B2 | 12/2022 | Bernardoni et al. |
| 11,539,357 | B2 | 12/2022 | Mayer et al. |
| 2002/0024376 | A1 | 2/2002 | Sander |
| 2003/0001533 | A1 | 1/2003 | Kleinau et al. |
| 2005/0184715 | A1 | 8/2005 | Kidokoro et al. |
| 2005/0270869 | A1 | 12/2005 | Krischke et al. |
| 2006/0023383 | A1 | 2/2006 | Thiery et al. |
| 2007/0008744 | A1 | 1/2007 | Heo et al. |
| 2009/0261766 | A1 | 10/2009 | Lurk et al. |
| 2011/0141643 | A1 | 6/2011 | Hummel et al. |
| 2012/0194119 | A1 | 8/2012 | Kroeze et al. |
| 2013/0082627 | A1 | 4/2013 | Ichikawa et al. |
| 2013/0301175 | A1 | 11/2013 | Posat |
| 2014/0078629 | A1 | 3/2014 | Cortigiani et al. |
| 2014/0091384 | A1 | 4/2014 | Petruzzi et al. |
| 2015/0039545 | A1 | 2/2015 | Li et al. |
| 2015/0285843 | A1 | 10/2015 | Michal |
| 2017/0063077 | A1 | 3/2017 | Donath et al. |
| 2017/0063367 | A1 | 3/2017 | Tsurumaru |
| 2017/0294772 | A1 | 10/2017 | Illing et al. |
| 2017/0294918 | A1 | 10/2017 | Illing et al. |
| 2017/0294922 | A1 | 10/2017 | Illing et al. |
| 2017/0366116 | A1 | 12/2017 | Ogawa et al. |
| 2018/0048140 | A1 | 2/2018 | Takuma et al. |
| 2018/0248351 | A1 | 8/2018 | Vail et al. |
| 2018/0287365 | A1 | 10/2018 | Djelassi-Tscheck et al. |
| 2018/0367073 | A1 | 12/2018 | Haas |
| 2019/0052074 | A1 | 2/2019 | Asam |
| 2019/0356161 | A1* | 11/2019 | Wakazono ............ H02J 7/0071 |
| 2020/0021207 | A1 | 1/2020 | Donat et al. |
| 2020/0132725 | A1 | 4/2020 | Krummenacher et al. |
| 2021/0028615 | A1 | 1/2021 | Mayer et al. |
| 2021/0028780 | A1 | 1/2021 | Mayer et al. |
| 2021/0028781 | A1 | 1/2021 | Mayer et al. |
| 2021/0050718 | A1 | 2/2021 | Djelassi-Tscheck et al. |
| 2021/0050848 | A1 | 2/2021 | Bernardoni et al. |
| 2021/0050850 | A1* | 2/2021 | Djelassi-Tscheck ........................ H03K 17/6877 |
| 2021/0083659 | A1* | 3/2021 | Mayer .................... H03K 17/18 |
| 2025/0015796 | A1* | 1/2025 | Djelassi-Tscheck ........................ H03K 17/223 |

FOREIGN PATENT DOCUMENTS

| | | | | |
|---|---|---|---|---|
| DE | 102015144460 | A1 | | 3/2017 |
| DE | 102017107521 | A1 | | 10/2017 |
| DE | 102017107520 | A1 * | 11/2017 | ............ H02H 3/093 |
| DE | 102017107523 | A1 | | 11/2017 |
| DE | 102017106896 | A1 | | 10/2018 |
| DE | 102020100601 | A1 | | 7/2020 |
| DE | 102020105094 | A1 | | 9/2021 |
| WO | 0169784 | A1 | | 9/2001 |

OTHER PUBLICATIONS

International Standard ISO 26262-1, Second Edition, Dec. 2018, entitled "Road vehicles—Functional safety—Part 1: Vocabulary," 42 pp.

International Standard ISO 7637-2, Third Edition, Mar. 1, 2011, entitled "Road vehicles—Electrical disturbances from conduction and coupling—Part 2: Electrical transient conduction along supply lines only," 48 pp.

Jain et al., "Analysis and Design of Digital IIR Integrators and Differentiators Using Minimax and Pole, Zero, and Constant Optimization Methods," accepted May 2013, 15 pp.

Office Action from counterpart German Application No. 10 2022 115 099.2 dated May 27, 2023, 4 pp.

Oppenheim et al., Chapter 6, Section 6.3 Basic Structures for IIR Systems, Discrete-Time Signal Processing, 2nd Edition, 1999, pp. 359-361. (Applicant points out, in accordance with MPEP 609. 94(a), that the year of publication, 1999, is sufficiently earlier than the effective U.S. filing date, so that the particular month of publication is not in issue.).

U.S. Appl. No. 18/296,878, filed Apr. 6, 2023, naming inventors Pidutti et al.

* cited by examiner

INTELLIGENT SEMICONDUCTOR SWITCH

This Application claims priority to German Application Number 102022115099.2, filed on Jun. 15, 2022, the entire content of which is incorporated herein by reference.

TECHNICAL FIELD

This description relates to the field of intelligent semiconductor switches.

BACKGROUND

Almost every electrical installation (e.g. in an automobile, in a house, electrical sub-systems of major installations) contains one of a number of fuses to protect against excessive currents. Standard fuses contain a piece of wire that provides a low-impedance current path as long as the current flowing through the fuse is below a rated current. However, the piece of wire is designed to heat up and melt or evaporate if the current flowing through the fuse exceeds the rated current for a certain period of time. Once such a fuse has been triggered, it must be replaced by a new one.

Fuses are increasingly being replaced by circuit breakers. An automatic circuit breaker is an automatically operated electrical switch, which is designed to protect an electrical circuit against damage caused by overcurrent or overload or short circuit. Automatic circuit breakers can contain electromechanical relays that are triggered to disconnect the protected circuit from the supply when an overcurrent (i.e. a current exceeding the rated current) is detected. In many applications (e.g. in the on-board power supply of an automobile), circuit breakers can be implemented using an electronic switch (e.g. an MOS transistor, an IGBT or the like) to disconnect the circuit to be protected from the supply in the event of an overcurrent. Such automatic fuses are also known as electronic fuses (E-fuses, or intelligent fuses). In addition to its function as an automatic circuit breaker, an electronic fuse can also be used to switch a load on and off in the normal manner. Normally, the switching state (ON/OFF) is controlled by electronic switches, such as MOS transistors, using so-called driver circuits, or drivers for short (gate drivers in the case of MOS transistors).

However, common driver circuits may be inadequate in terms of fault tolerance and functional safety, at least for some electronic fuses, which can be an issue in particular in automotive applications where functional safety standards (e.g. ISO 26262) must be observed. In fact, an electronic fuse requires more than simply replacing a classical fuse by an electronic switch. A robust implementation of an electronic fuse raises a number of challenges. In addition, the internal power consumption of the electronic fuse can be an issue, for example in automotive applications when the car is parked.

SUMMARY

The embodiments described herein relate inter alia to a circuit comprising an electronic switch with a load current path, which is switched between an output node and a supply node and is designed to connect or disconnect the output node to or from the supply node in accordance with a control signal. The circuit further comprises a control circuit which is designed to generate the control signal based on an input signal, and a current monitoring circuit which is designed to receive a current measurement signal that represents the load current flowing through the load current path, and to generate a protective signal, based on the current measurement signal, which indicates whether the output node should be disconnected from the supply node. The circuit further comprises a reverse current detection circuit, which is designed to detect that the load current is flowing in the reverse direction, namely from the output node to the supply node. The control circuit is designed to work at least in a normal mode and in an idle mode, wherein the control circuit switches from the normal mode into the idle mode if at least the following idle-mode conditions are met: the load current is below a current threshold; the electronic switch is switched on; and the reverse current detection circuit does not detect a load current in the reverse direction.

Further embodiments relate to a method comprising the following: activating and deactivating a load current path between an output node and a supply node by means of an electronic switch in accordance with a control signal, which is generated by a control circuit based on an input signal, wherein the control circuit can operate at least in a normal mode and in an idle mode. In the normal mode, the method further comprises generating a protective signal based on a current measurement signal, wherein the protective signal indicates whether the output node should be disconnected from the supply node in order to deactivate the load current path, and detecting a reverse current when the load current flows in the reverse direction, namely from the output node to the supply node. Finally, the method comprises switching from the normal mode into the idle mode if at least the following idle-mode conditions are met: the load current is below a current threshold value; the electronic switch is switched on; and no reverse current has been detected.

BRIEF DESCRIPTION OF THE DRAWINGS

The embodiments described here can be better understood by reference to the following drawings and descriptions. The components shown in the drawings are not necessarily true to scale; instead, emphasis has been placed on illustrating the principles underlying the exemplary embodiments. In addition, the same reference signs in the drawings identify corresponding parts.

DETAILED DESCRIPTION

Figure 1:
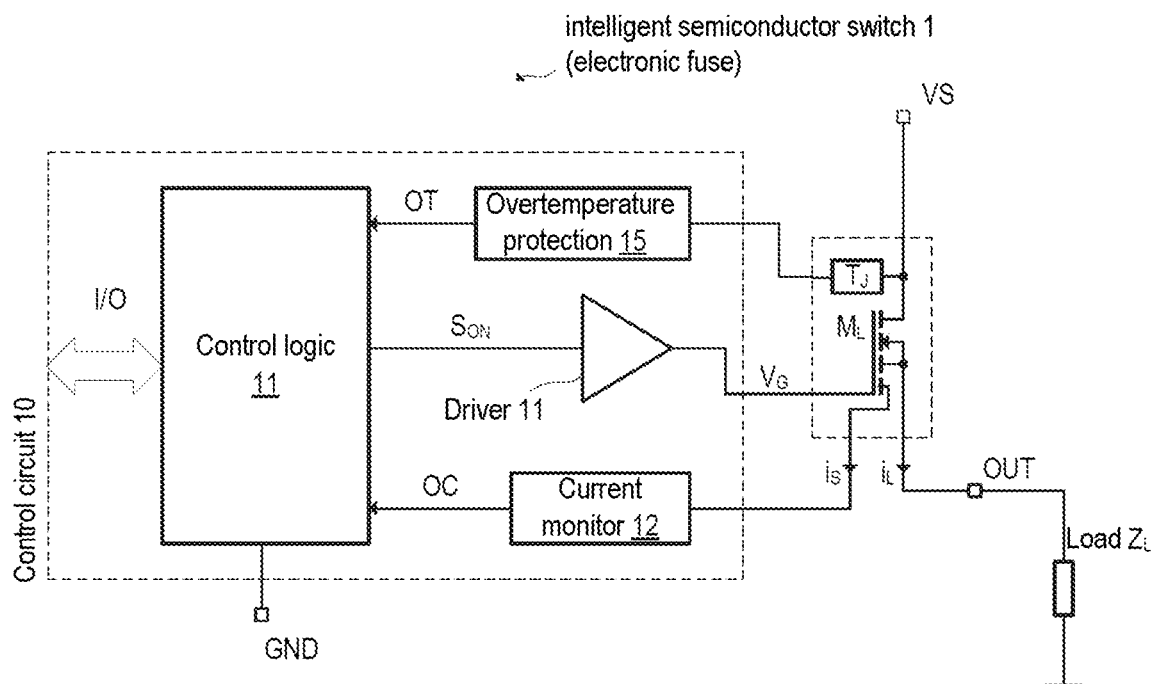
FIG. 1 illustrates an example of an intelligent semiconductor switch.

FIG. 1 illustrates an example of an intelligent semiconductor switch 1. In the example shown, the switching element itself is a MOS field-effect transistor $M_L$ (MOSFET). It is understood that the concept described here can also be applied to other types of electronic switches, provided that they allow a current flow in the reverse direction. In the case of a normal MOSFET, the body diode always allows current to flow in the reverse direction, unless this is prevented by external circuitry.

In the example shown, the electronic switch (MOSFET $M_L$) has a load current path that connects a supply node VS to an output node OUT. The electronic switch is designed to connect the output node OUT and the supply node VS to each other or to disconnect them from each other, in accordance with a control signal $S_{ON}$ (or the gate voltage $V_G$ dependent on it). A supply voltage Vs is present at the supply node VS during operation. When the switch is switched on, a load current $i_L$ flows through it to a load that is connected to the output node OUT. In the example shown in FIG. 1, the electronic switch $M_L$ is a high-side switch and the load $Z_L$ is switched between the output node OUT and a ground node GND, to which a ground potential $V_{GND}$ is applied during operation. The aforementioned control signal $S_{ON}$ is generated by a control circuit 10 based on an input signal $S_{IN}$ (see FIG. 2). In the example shown, the control signal $S_{ON}$ is provided by a control logic 11 contained in the control circuit 10.

The intelligent semiconductor switch 1 in accordance with FIG. 1 also has a current monitoring circuit 12 (current monitor). This is designed to receive a current measurement signal is, which represents the load current $i_L$ flowing through the load current path. Based on this, the current monitoring circuit 12 generates a protective signal OC, which indicates whether the output node OUT should be disconnected from the supply node VS. The protective signal can also be based on a current-time characteristic curve, which simulates the behavior of a fuse. This means that short current peaks are accepted for a certain period of time. A shutdown is only signaled (signal OC) if a load current $i_L$ greater than the nominal current persists for a certain length of time, with the duration depending on the load current (according to the current-time characteristic curve). For a load current less than or equal to the nominal current, the duration is infinite (i.e. the fuse is not tripped).

The intelligent semiconductor switch 1 from FIG. 1 further comprises an overtemperature protection circuit 15. This is designed to receive at least one temperature measurement signal that represents a temperature $T_J$ of the electronic switch $M_L$, and to generate a further protective signal OT based on the temperature measurement signal, which indicates whether the output node OUT should be disconnected from the supply node VS. The temperature $T_J$ designates in particular the barrier layer temperature of the transistor $M_L$. In some exemplary embodiments a further temperature sensor is provided, which measures a chip temperature $T_A$ away from the transistor $M_L$ and supplies a corresponding temperature measurement signal. In this case, the overtemperature protection circuit 15 may be designed to signal a shutdown, both if the temperature difference $T_J$-$T_A$ exceeds a specified (or adjustable) first threshold value and if the barrier layer temperature $T_J$ reaches a second threshold value (maximum temperature). Suitable on-chip temperature sensors are generally known (e.g. pn-junctions of diodes or transistors) and are therefore not discussed further here.

The control logic 11 is designed to set the control signal $S_{ON}$ for the transistor $M_L$ to a Low level if the overtemperature protection circuit 15 or the current monitoring circuit 12 signal a shutdown of the semiconductor switch $M_L$. The transistor $M_L$ is switched on in accordance with the input signal $S_{IN}$ mentioned above. This input signal can be a logic signal, which is received on a dedicated chip pin (see FIG. 2). However, the input signal can also be generated by a digital communication interface, which allows the intelligent semiconductor switch 1 to communicate with other circuits (e.g. with an external controller). The digital communication interface can be, for example, a Serial Peripheral Interface (SPI), via which a switch-on command or a switch-off command is received. In response to the receipt of a command, the communication interface can signal a corresponding activation or deactivation of the transistor $M_L$ to the control logic 11 (e.g. by means of the aforementioned input signal $S_{IN}$). SPI is, of course, just one example and any other communication interfaces are possible.

Figure 2:
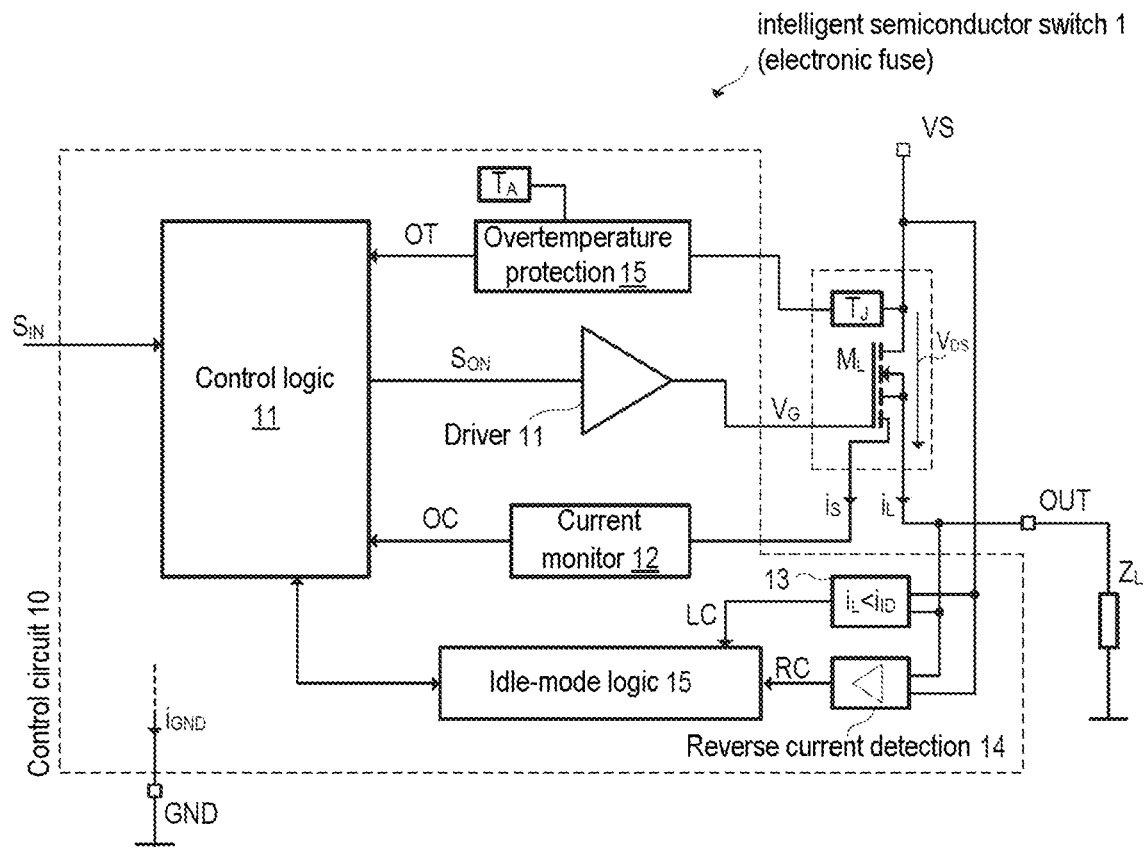
FIG. 2 illustrates a refinement of the example from FIG. 1.

FIG. 2 illustrates a refinement of the example from FIG. 1. The example from FIG. 2 is largely identical to the example from FIG. 1, however, the semiconductor switch 1 from FIG. 2 has the capability to operate in an idle mode in which the internal current consumption of the intelligent semiconductor switch is reduced. For example, switching to idle mode makes it possible to reduce the internal current consumption of the control circuit 10 of the intelligent semiconductor switch 1 from around 2 mA to approx. 30 µA. In idle mode, the transistor $M_L$ is on to supply power to the load $Z_L$, but some components of control circuit 10 and control logic 11 are disabled to reduce power consumption in the idle mode. In particular, the current monitoring circuit 12 is inactive in idle mode.

In the example shown (FIG. 2), the intelligent semiconductor switch 1 further comprises a reverse current detection circuit 14, which is designed to detect that the load current $i_L$ is flowing in the reverse direction, namely from the output node OUT to the supply node VS. Switching from normal operation (normal mode) into idle mode is subject to various conditions. In accordance with one exemplary embodiment the control circuit 10 is designed to then switch from normal mode into idle mode if at least the following idle-mode conditions are met: (1.) the load current $i_L$ is below a current threshold $i_{ID}$, (2.) the electronic switch $M_L$ is switched on, and (3.) the reverse current detection circuit 14 detects no load current in the reverse direction.

The block 15 (idle-mode logic) shown in FIG. 2 can be regarded as a component of the control logic 11. The block 15 is shown separately in FIG. 2 only to highlight its significance for the idle mode. The second of the above conditions (the electronic switch $M_L$ is switched on) can be easily checked by the control logic 11 (or the idle-mode logic 15 contained therein), since the level of the control signal $S_{ON}$ is of course known to the control logic. The first and third conditions can be checked by the idle-mode logic 15 using detector circuits 13 and 14.

The current detector circuit 13 is designed to detect whether the load current $i_L$ is below the current threshold value $i_{ID}$, for example, by comparing the voltage $V_{DS}$ between supply node VS and output node OUT with a reference value $V_{REF}$. When the transistor $M_L$ is switched on, the voltage $V_{DS}$ is equal to $R_{ON} \cdot i_L$, where $R_{ON}$ is the forward resistance of the MOSFET. The reference value $V_{REF}$ is therefore $R_{ON} \cdot i_{ID}$. This determines the current threshold value $i_{ID}$. That is, if the condition $V_{DS} < V_{REF}$ is met, then the condition $i_L < i_{ID}$ is also met and the logic signal LC is at a High level. The two conditions ($V_{DS} \leq V_{REF}$ and $i_L < i_{ID}$) are equivalent in practice.

Similarly, the reverse current detection circuit 14 can detect a reverse current, namely by comparing the voltage $V_{DS}$ between supply node VS and output node OUT with a negative reference value $V_{RC}$, where the reference value in practice is close to zero volts. That is, if the condition $V_{DS} < V_{RC}$ is met (where $V_{RC} < 0V$), this means that the load current $i_L$ is flowing in the reverse direction ($i_L < 0A$). A High level of the logic signal RC indicates a reverse current.

The detector circuits 13 and 14 are also active during idle mode but can be built with very low internal power consumption. The internal power consumption is manifested as a current $i_{GND}$, which flows away from the control circuit 10 to a ground node GND, which can be connected to a dedicated chip pin. Apart from the above explanations of the idle mode, the exemplary embodiment from FIG. 2 functions in the same way as the example from FIG. 1 and reference is made to the relevant description of FIG. 1.

Figure 3:
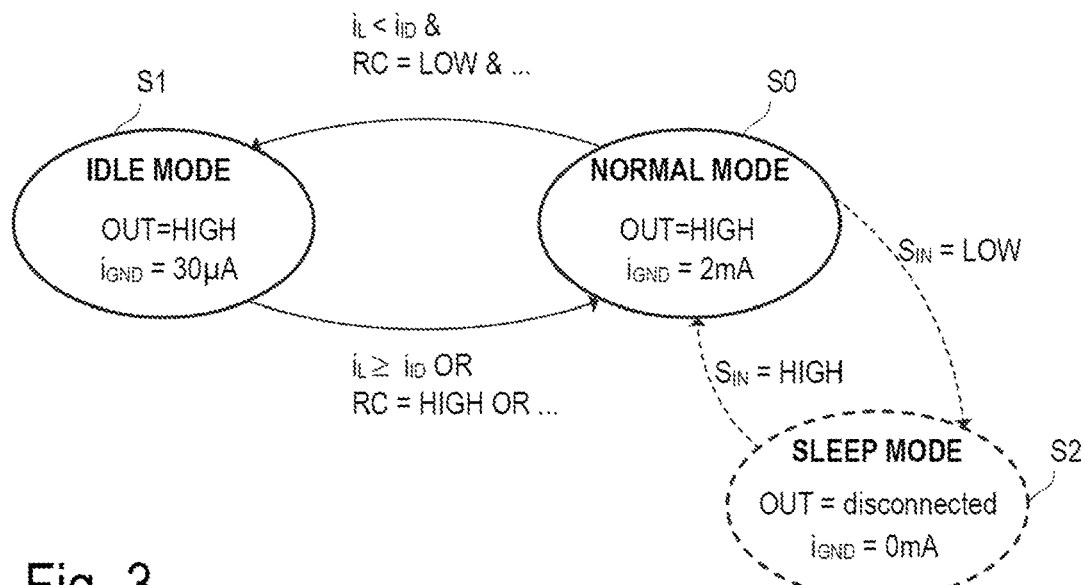
FIG. 3 is a diagram illustrating the states of the control logic in the example from FIG. 2.

FIG. 3 illustrates the states of the control circuit 10 and in particular of the control logic 11 using a state diagram. In addition to the idle mode S1 and the normal mode S0, an (optional) sleep mode S2 is also shown in FIG. 3, which will be explained later. The following explanation assumes that the input signal Sm signals the switching on of transistor $M_L$. For use as an electronic fuse, a switched-on state of the transistor $M_L$ is the normal state, i.e. the above-mentioned second condition (switch is switched on) is met, and the output node OUT is at a High level of approximately $V_{DS}$. The internal power consumption is relatively high in normal mode. In the example described here, this means $i_{GND} \approx 2$ mA.

If the other two idle-mode conditions are met ($i_L < i_{ID}$ and RC=Low, i.e. no reverse current), then the control circuit 10 switches to the idle mode, in which in particular the current monitoring circuit 12 is inactive in order to reduce the internal current consumption of the control circuit 10. In the example described here, this means $i_{GND} \approx 30$ µA. According to one exemplary embodiment, all components that are not required for checking the conditions of a mode change are deactivated. In addition to the current monitoring circuit 12, the overtemperature protection circuit 15 can also be inactive in idle mode. As mentioned, detector circuits 13 and 14 can be implemented with very low internal power consumption.

As soon as it is detected that one of the idle mode conditions is no longer met, the control circuit 12 switches back into normal mode. The condition $S_{IN}$=High can be considered as a further idle-mode condition, so that actively switching off the transistor $M_L$, e.g. by an external controller, results in a return to the normal mode. In the example shown in FIG. 3, a change from $S_{IN}$=High to $S_{IN}$=Low ultimately leads to a change into the sleep mode, in which further components can be switched off. Essentially, in sleep mode, only the communication interface needs to be active, in order to trigger a "wake-up" of the control circuit 10 and to enable the transistor $M_L$ to be switched on again. The internal power consumption in the sleep mode can be approximately zero amperes, depending on the implementation.

In the example shown, actively switching off the transistor $M_L$ (triggered by a level change of the input signal $S_{IN}$ from High to Low) during idle mode first leads to a switch into the normal mode and then to a switch into the sleep mode. In other examples, a direct switch from idle mode to sleep mode may also be implemented.

Figure 4:
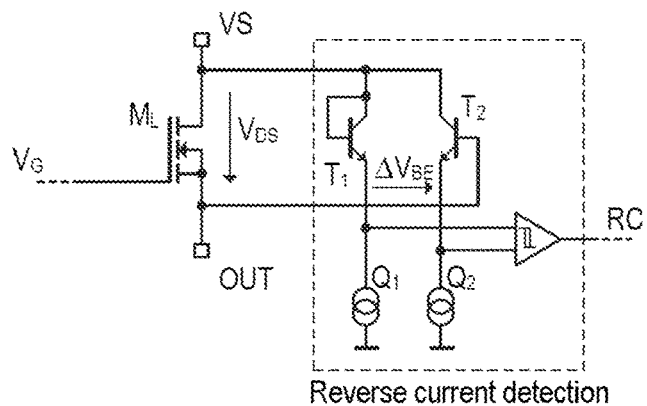
FIG. 4 illustrates a first example of a circuit for reverse current detection with low internal current consumption.

FIG. 4 illustrates a first example of a circuit for reverse current detection with low internal current consumption. According to FIG. 3, the supply node VS is connected to the inputs of a comparator K1 via the collector-emitter current paths of a first and a second bipolar transistor $T_1$, $T_2$, wherein the base of the transistor $T_1$ is connected to the supply node VS and the base of the transistor $T_2$ is connected to the output node OUT, so that the equation $V_{DS}=V_{BE1}-V_{BE2}=\Delta V_{BE}$ is valid ($V_{BE1}$ and $V_{BE2}$ denote the base-emitter voltages of transistors $T_1$ and $T_2$ respectively). The emitters of both transistors $T_1$, $T_2$ are each coupled to the current sources $Q_1$ and $Q_2$, which provide a bias current $i_E$. In the example shown, this bias current is the same for both transistors $T_1$ and $T_2$. The current sources $Q_1$ and $Q_2$ do not need to be dedicated current source circuits, but the bias currents $i_E$ can also be realized by the (relatively small) input currents of the comparator. The comparator can have a hysteresis, as shown in the example.

Figure 5:
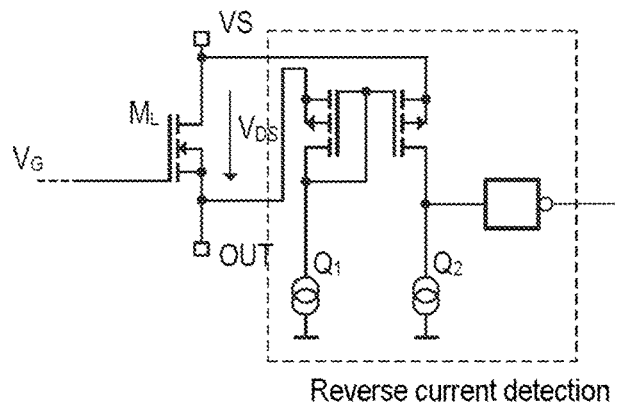
FIG. 5 illustrates a further example of a circuit for reverse current detection with low internal current consumption.

FIG. 5 illustrates a further example of a circuit for reverse current detection with low internal current consumption. In this example, the transistors $T_1$ and $T_2$ are MOS transistors (p-channel type) and form a current mirror, wherein the source electrode of transistor $T_1$ is connected to the output node OUT and the source electrode of transistor $T_2$ is connected to the supply node VS. The gate electrodes of both transistors $T_1$, $T_2$ are connected to the drain electrode of the transistor $T_1$. Similar to FIG. 4, the drain electrodes of the transistors $T_1$ and $T_2$ are coupled to current sources $Q_1$ and $Q_2$, each providing a bias current. In other words, the current mirror $T_1$, $T_2$ works counter to the current sources $Q_1$ and $Q_2$. The level in the circuit node in which the current source $Q_2$ and the transistor $T_2$ are connected depends on the voltage $V_{DS}$, as this affects the difference in the gate-source voltages of the two transistors. At negative voltage $V_{DS}$, the potential in the circuit node between $Q_2$ and $T_2$ is low, and the inverter is designed to invert this potential and output a High level if the $V_{DS}$ voltage is negative, which indicates a load current in the reverse direction.

Figure 6:
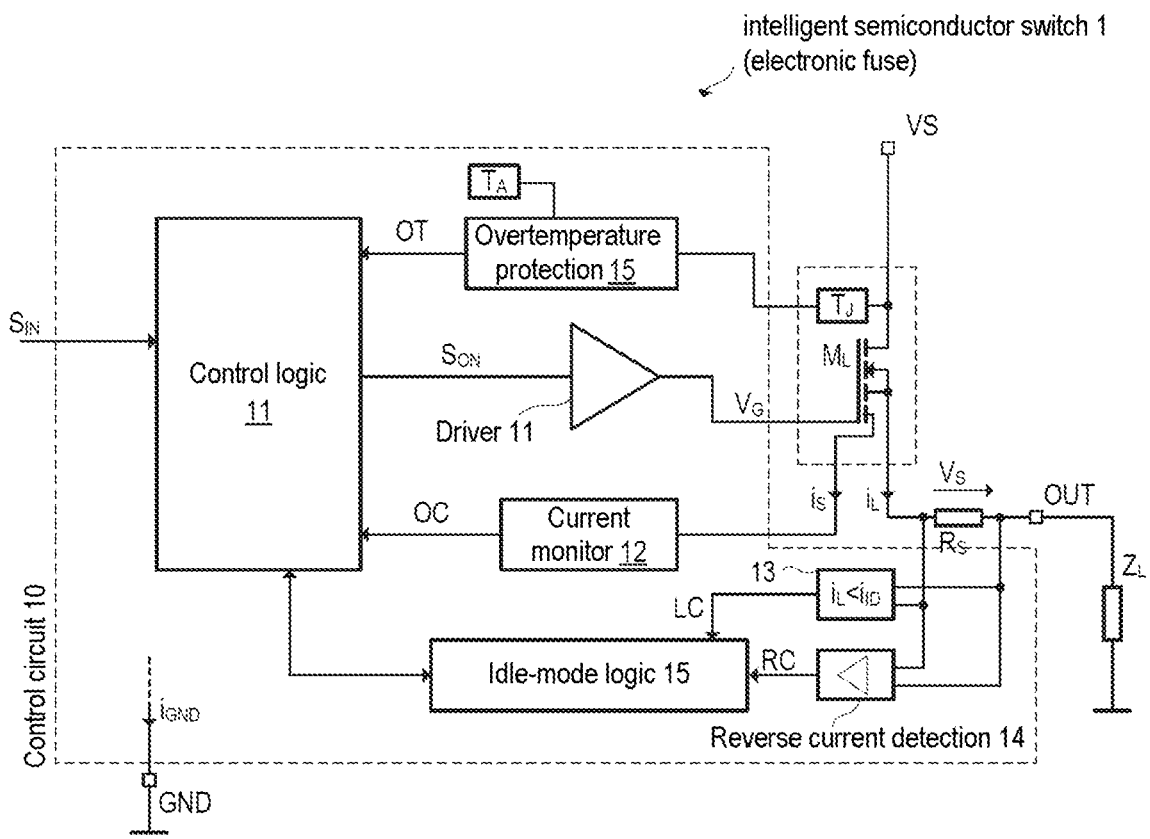
FIG. 6 shows a modification of the example from FIG. 2.

In the examples described above, the reverse current is detected based on the drain-source voltage at the power transistor $M_L$. FIG. 6 shows a modification of the example from FIG. 2, according to which a reverse current (i.e. a negative load current $i_L<0A$) is detected based on the voltage drop $V_{SENSE}$ across a sense resistor $R_S$, wherein the sense resistor can be connected in series with the drain-source current path. The circuit according to FIG. 6 is identical to the circuit from FIG. 2 except for the fact that the detection circuits 12 and 14 "see" the voltage $V_{SENSE}$ as the input voltage instead of the voltage $V_{DS}$. In this case, the resistor $R_S$ assumes the function of the resistor $R_{ON}$. In other implementations, the total resistance $R_S+R_{ON}$ can also be used for the evaluation. In this case, the detection circuits 13 and 14 see the voltage $i_L \cdot (R_{ON}+R_S)$. In the example from FIG. 6, the resistor is connected to the transistor $M_L$ on the source side. In an alternative implementation, the resistor $R_S$ is connected to the transistor $M_L$ on the drain side.

The following text summarizes various aspects of the exemplary embodiments described here. This is not a complete list of features, but merely an example list. One exemplary embodiment relates to a method for controlling an intelligent semiconductor switch. The method comprises activating and deactivating a load current path between an output node and a supply node by means of an electronic switch in accordance with a control signal (see FIGS. 2 and 6, electronic switch $M_L$ between nodes VS and OUT). The control signal (see FIGS. 2 and 6, control signal $S_{ON}$) is generated by a control circuit based on an input signal. The control circuit is designed to work at least in a normal mode (see FIG. 3, mode S0) and in an idle mode (see FIG. 3, mode S1). The method further comprises generating a protective signal based on the current measurement signal, wherein the protective signal indicates whether the output node should be disconnected from the supply node in order to deactivate the load current path (see FIGS. 2 and 6, protective signal OC of the current monitoring circuit 12). The method further comprises detecting a reverse current when the load current flows in the reverse direction, namely from the output node to the supply node. The control circuit switches from normal mode into idle mode if at least the following idle-mode conditions are met: (1.) the load current is below a current threshold value; (2.) the electronic switch is switched on; and (3.) no reverse current is detected.

The input signal $S_{IN}$ can be fed to a dedicated chip pin or provided by a communication interface based on a received command. In idle mode, at least the current monitoring circuit, which generates the protection signal based on the current measurement signal (and also based on a current-time characteristic curve), is inactive in order to implement the function of an electronic fuse.

In one exemplary embodiment, the reverse current is detected by means of a comparator circuit, which detects a negative voltage between the supply node and the output node. Alternatively, a negative voltage is detected across a measurement resistor (see FIG. 6, measurement resistor $R_S$). In particular, the comparator circuit detects whether the voltage between the supply node and the output node falls below a specified (negative) voltage threshold value (see third idle-mode condition).

The method further comprises comparing the voltage between the supply node and output node with a reference value in order to detect whether the load current is below the current threshold value, which is determined by the reference value (see first idle mode condition).

In one exemplary embodiment, the method further comprises measuring at least one temperature of the electronic switch and generating a further protective signal (see FIGS. 2 and 6, signal OT) based on the measured temperature. The additional protective signal indicates whether the output node should be disconnected from the supply node. This overtemperature protection circuit, which generates the protection signal, can be inactive in the idle mode.

Figure 7:
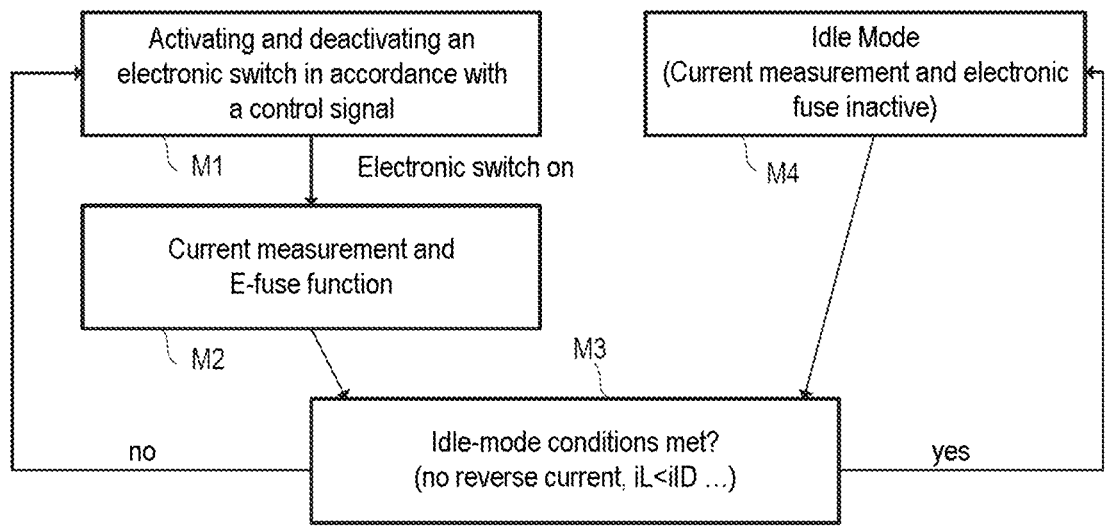
FIG. 7 is a flowchart illustrating an example of the method described here.

FIG. 7 is a flow diagram illustrating an exemplary embodiment of the method described here for operating an integrated electronic fuse. Accordingly, the method comprises activating and deactivating a current path between an output node and a supply node by means of an electronic switch in accordance with a control signal (see FIG. 7, block M1). The control signal is generated by a control circuit based on an input signal (see FIG. 2, signal $S_{IN}$), and the control circuit can operate at least in a normal mode and in an idle mode (see FIG. 3; modes S0 and S1).

In normal mode, the method further comprises generating a protective signal based on a current measurement signal (E-fuse function, see FIG. 7, block M2), wherein the protective signal indicates whether the output node should be disconnected from the supply node in order to deactivate the load current path. The method further comprises detecting a reverse current when the load current flows in the reverse direction, namely from the output node to the supply node, as well as switching from the normal mode into the idle mode (see FIG. 7, block M3), if at least the following idle-mode conditions are met: (1.) the load current is below a current threshold value; (2.) the electronic switch is switched on; and (3.) no reverse current has been detected. In idle mode, various components of the control circuit can be deactivated, for example the E-fuse function (see FIG. 7, block M4). If one of the mentioned idle-mode conditions is no longer met, the system switches back into normal mode (see FIG. 7, block M4).

The invention claimed is:

1. A circuit comprising:
   an electronic switch with a load current path, wherein the electronic switch is connected between an output node and a supply node and configured such that it connects or disconnects the output node to or from the supply node in accordance with a control signal;
   a control circuit configured to generate the control signal based on an input signal; and
   a current monitoring circuit configured to receive a current measurement signal that represents the load current flowing through the load current path, and to generate a protective signal based on the current measurement signal, wherein the protective signal indicates whether the output node should be disconnected from the supply node;
   a reverse current detection circuit configured to detect that the load current is flowing in a reverse direction from the output node to the supply node;
   wherein the control circuit is configured to work at least in a normal mode and in an idle mode; and
   wherein the control circuit is configured to switch from the normal mode into the idle mode if at least the following idle-mode conditions are met: the load current is below a current threshold; the electronic switch is switched on; and the reverse current detection circuit does not detect the load current in the reverse direction.

2. The circuit as claimed in claim 1,
   wherein in the idle mode, at least the current monitoring circuit is inactive.

3. The circuit as claimed in claim 1,
   wherein the reverse current detection circuit includes a comparator circuit configured to detect a negative voltage between the supply node and the output node.

4. The circuit as claimed in claim 3,
   wherein the comparator circuit is configured to detect when the voltage between the supply node and the output node falls below a voltage threshold value.

5. The circuit as claimed in claim 1, further comprising:
   a current detector circuit configured to detect, by comparing the voltage between the supply node and the output node with a reference value, whether the load current is below the current threshold determined by the reference value.

6. The circuit as claimed claim 1, further comprising:
   an overtemperature protection circuit configured to receive at least one temperature measurement signal that represents a temperature of the electronic switch, and to generate a further protective signal based on the temperature measurement signal, wherein the further protective signal indicates whether the output node should be disconnected from the supply node,
   wherein in the idle mode, the overtemperature protection circuit is inactive.

7. The circuit as claimed in claim 1,
   wherein the current monitoring circuit is configured to signal a deactivation of the electronic switch based on the current measurement signal and a current-time characteristic curve.

8. The circuit as claimed in claim 1,
   wherein the control circuit is configured to switch from the idle mode into the normal mode if at least one of the idle mode conditions is not met.

9. A method comprising:
   activating and deactivating a load current path between an output node and a supply node via an electronic switch in accordance with a control signal generated by a control circuit based on an input signal, wherein the control circuit can operate at least in a normal mode and in an idle mode,
   in the normal mode: generating a protective signal based on a current measurement signal, wherein the protective signal indicates whether the output node should be disconnected from the supply node in order to deactivate the load current path;

detecting a reverse current when the load current flows in the reverse direction from the output node to the supply node; and switching from the normal mode into the idle mode when at least the following idle-mode conditions are met: the load current is below a current threshold; the electronic switch is switched on; and no reverse current has been detected.

10. The method as claimed in claim 9, further comprising:

switching from idle mode into normal mode if at least one of the idle-mode conditions is no longer met.

* * * * *